US010969431B1

(12) United States Patent
Dorrance et al.

(10) Patent No.: US 10,969,431 B1
(45) Date of Patent: Apr. 6, 2021

(54) ERROR-TOLERANT ARCHITECTURE FOR POWER-EFFICIENT COMPUTING

(71) Applicant: Intel Corporation, Santa Clara, CA (US)

(72) Inventors: Richard William Dorrance, Hillsboro, OR (US); Andrey Vladimirovich Belogolovy, Hillsboro, OR (US); Xue Zhang, Portland, OR (US); Hechen Wang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/724,576

(22) Filed: Dec. 23, 2019

(51) Int. Cl.
*G06F 17/50* (2006.01)
*G01R 31/00* (2006.01)
*G01R 31/3177* (2006.01)
*G06F 30/398* (2020.01)
*G06F 30/3308* (2020.01)
*G06F 30/20* (2020.01)

(52) U.S. Cl.
CPC ....... *G01R 31/3177* (2013.01); *G06F 30/398* (2020.01); *G06F 30/20* (2020.01); *G06F 30/3308* (2020.01)

(58) Field of Classification Search
CPC .... G06F 30/398; G06F 30/3308; G06F 30/20; G01R 31/3177
USPC ...................................... 716/136; 703/16, 20
See application file for complete search history.

(56) References Cited

U.S. PATENT DOCUMENTS

| 3,752,393 | A | * | 8/1973 | Moseley | G01F 15/046 702/45 |
| 5,974,436 | A | * | 10/1999 | Inoue | G06F 7/5525 708/606 |
| 2003/0123535 | A1 | * | 7/2003 | Nayak | H03G 5/005 375/229 |
| 2015/0006533 | A1 | * | 1/2015 | Shinzato | G06F 16/3344 707/737 |

(Continued)

OTHER PUBLICATIONS

I. V. McLoughlin, et al., "Fault Tolerance Through Redundant COTS Components for Satellite Processing Applications," Proceedings of the 2003 Joint Fourth International Conference on Information, Communications and Signal Processing, and the Fourth Pacific Rim Conference on Multimedia, vol. 1, 5 pages total, 2003.

(Continued)

*Primary Examiner* — Phallaka Kik
(74) *Attorney, Agent, or Firm* — Trop, Pruner & Hu, P.C.

(57) ABSTRACT

A semiconductor package comprises a controlled voltage domain (CVD) and a master voltage domain (MVD). The MVD comprises an error-tolerance control (ETC) circuit. A basic execution block in the CVD generates a basic output value, based on at least two input values. A test execution block in the CVD generates a test digital root, based on digital roots of the input values. A digital root comparator in the CVD determines whether a digital root of the basic output value matches the test digital root. An error reporter in the CVD sends an error report to the ETC circuit in response to a determination that the digital roots do not match. The ETC may automatically adjust at least one power characteristic of the CVD, based on the error report. Other embodiments are described and claimed.

20 Claims, 9 Drawing Sheets

(56) References Cited

U.S. PATENT DOCUMENTS

| | | | | |
|---|---|---|---|---|
| 2015/0012737 A1* | 1/2015 | Newell | ................ | G06F 21/575 |
| | | | | 713/2 |
| 2016/0041947 A1* | 2/2016 | Rarick | ................ | G06F 7/5525 |
| | | | | 708/605 |
| 2020/0177603 A1* | 6/2020 | Wang | .................... | G06Q 40/02 |

OTHER PUBLICATIONS

Dan Ernst, et al., "RAZOR: Circuit-Level Correction of Timing Errors For Low-Power Operation," IEEE Micro, vol. 24, No. 6, 11 pages total, Nov. 2004.

Jiajing Wang, et al., "Techniques to Extend Canary-Based Standby VDD Scaling for SRAMs to 45 nm and Beyond," IEEE Journal of Solid-State Circuits, vol. 43, No. 11, 11 pages total, Nov. 2008.

\* cited by examiner

ERROR-TOLERANT ARCHITECTURE FOR POWER-EFFICIENT COMPUTING

TECHNICAL FIELD

The present disclosure pertains in general to data processing systems and in particular to technology for managing the power efficiency of a processor.

BACKGROUND

For circuit design in computing and communications architectures, the required level of hardware reliability is fixed at design time to ensure deterministic circuit behavior. A typical requirement for hardware reliability is for the hardware to have a probability of error that is less than $10^{-15}$. For purposes of this disclosure, a probability of error of $10^{-15}$ may be referred to as the "standard error probability" or as "standard reliability."

Hardware designers generally make trade-offs between power and performance to achieve standard reliability. In particular, to achieve standard reliability, a circuit typically requires at least a particular supply voltage and is limited to a particular maximum operating frequency.

However, at runtime, many applications can run effectively on hardware that has less than standard reliability. For example, applications which provide for computer vision and graphics, for wireless signal processing functions such as forward error correcting codes, or for artificial neural networks may operate effectively with a probability of error that is significantly greater than the standard error probability, On the other hand, some applications require more than standard reliability. For example, applications which provide for the operation and management of cloud computing servers and databases, or applications in fields such as aerospace, autonomous vehicles, and deep space, may require a probability of error that is significantly less than the standard error probability.

A conventional approach to achieve more than standard reliability is to use redundant hardware and computations. For instance, applications that require extremely high levels of reliability (e.g., application for satellites and other space-based systems) may use redundant hardware and computations to improve hardware reliability. However, using redundant hardware and computations to improve hardware reliability entails significantly increased overhead, relative to systems with less redundancy or no redundancy.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
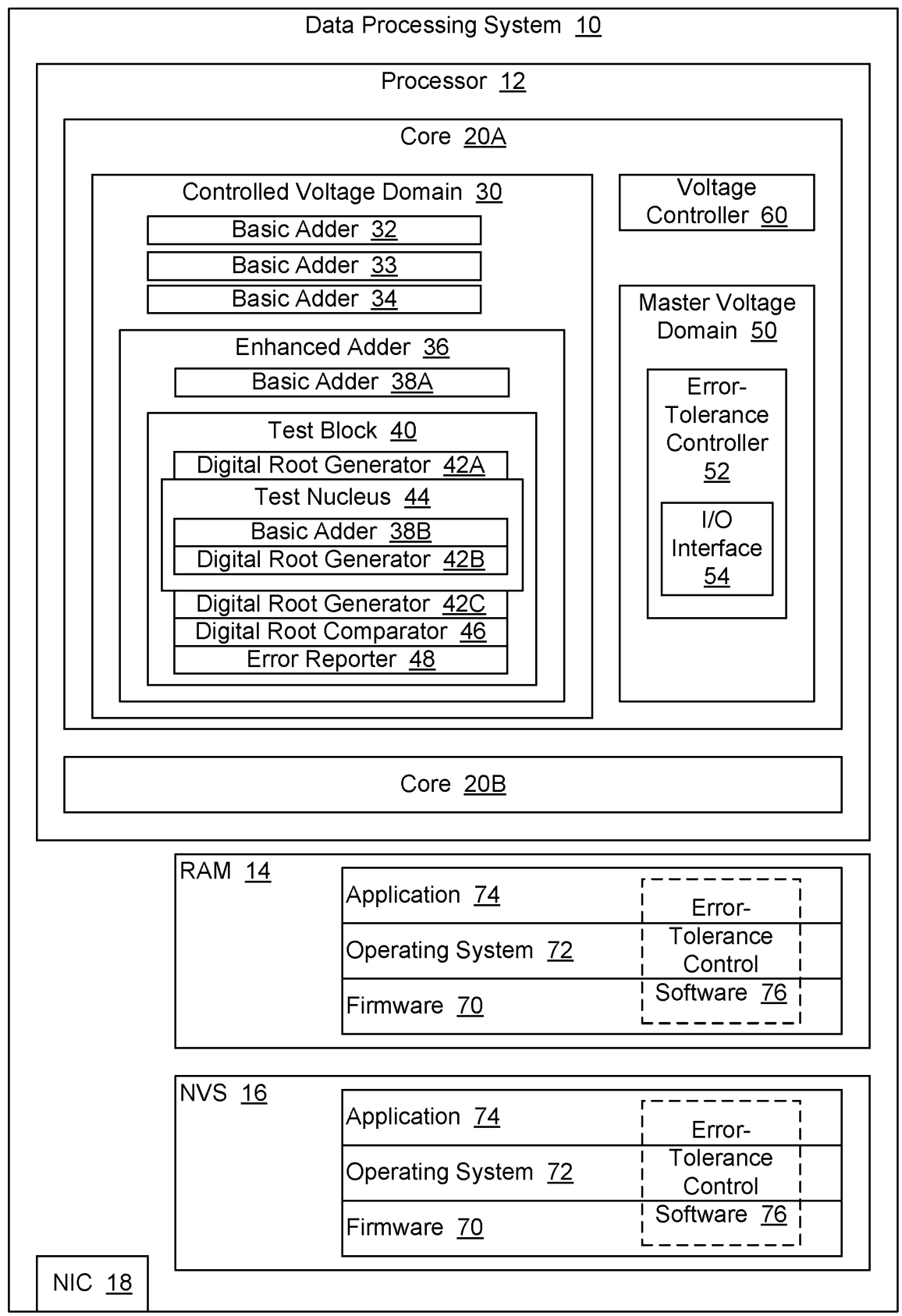
FIG. 1 is a block diagram of an example embodiment of a data processing system with a processor that features an error-tolerant architecture for power-efficient computing.

As indicated above, a conventional approach to achieve increased reliability for a processor is to design the processor to include redundant hardware and computations.

A more flexible approach is to dynamically adjust power based on detected error rates. The present disclosure involves using the mathematical concept of a digital root, which is a one-digit sum of digits, to detect errors. In particular, a processor according to the present disclosure uses digital roots to detect computation errors substantially instantaneously, and the processor dynamically adjusts power characteristics of the processor to maintain a target error rate.

In other words, a processor according to the present disclosure has an error-tolerant architecture (ETA) for power-efficient computing, and that ETA involves circuits for generating digital roots. Accordingly, an ETA according to the present disclosure may be referred to as a "digital-root based ETA" (DRBETA). In at least one embodiment, a DRBETA includes a lightweight hardware solution for detecting computation errors in hardware and for dynamically adjusting circuit reliability after physical fabrication. Consequently, a processor with a DRBETA may achieve dramatically improved power and performance, relative to a conventional processor. For instance, in a processor with a DRBETA, the blocks for digital signal processing (DSP) (e.g., the decoder blocks for implementing low-density parity-check (LDPC) operations) may operate with significantly reduced power and/or with a significantly higher frequency, relative to the blocks for DSP in a conventional processor.

In addition or alternatively, a processor with a DRBETA may provide a significant improvement in circuit reliability for mission-critical systems, with much reduced overhead, compared to more traditional techniques. For example, the redundant hardware components and computations used in a conventional mission-critical processor may incur area and/or power overheads of 200-300%, relative to a processor without those redundant hardware components and computations. In addition, the redundant hardware components and computations may reduce the performance of the processor, relative to a processor without those redundant hardware components and computations.

A digital root function is a type of a hash function that generates a single-digit output. For instance, as indicated by the Wikipedia entry for "digital root", "the digital root . . . of a non-negative integer is the (single digit) value obtained by an iterative process of summing digits, on each iteration using the result from the previous iteration to compute a digit sum. The process continues until a single-digit number is reached." Another way to define digital roots is as follows:

The digital root for a number n, in base b, is defined as:

$$dr(n, b) = \begin{vmatrix} 0, & n = 0 \\ 1 + (n-1) \bmod (b-1), & n \neq 0 \end{vmatrix}$$

In addition, digital roots have the following characteristics for the following operations:

$dr(a+b)=dr(dr(a)+dr(b))$  1.

$dr(a-b)=dr(dr(a)-dr(b))$  2.

$dr(a*b)=dr(dr(a)*dr(b))$  3.

$dr(a/b)=>dr(a)=dr(dr(b)*dr(a\backslash b)+dr(a \bmod b))$  4.

$dr(a^n)=dr(dr^n(a))$  5.

where "dr( )" denotes a digital root function, the symbol "=>" means "implies," and the symbol "\" denotes the quotient (i.e., the integer portion from division). Consequently, digital roots are suitable for detecting computational errors using the techniques described herein.

A processor may calculate and use a digital root in an analogous manner to the way a wireless communications system calculates and uses a cyclic redundancy check (CRC) code. Digital roots may be used to detect computational and timing errors for operations or instructions such as addition, subtraction, multiplication, division, and exponentiation. Accordingly, digital roots may also be used to also protect operations like comparisons, minimum/maximum, and branching.

The following example illustrates how digital roots (in base 10) may be used to verify the result of a multiplication. In particular, this example illustrates how digital roots may be used to verify that 1357*8962=12161434.

Calculate the digital roots of the input values:

1+3+5+7=16; 1+6=7

8+9+6+2=25; 2+5=7

Calculate the digital root of the original result:

1+2+1+6+1+4+3+4=22; 2+2=4

Multiply the digital roots of the input values together to get a new result:

7*7=49

Calculate the digital root of the new result:

4+9=13; 1+3=4

Compare the digital root of the original result with the digital root of the new result:

4==4?

Also, from a theoretical standpoint, boundaries for the hardware complexity to implement a digital root function may be based upon the concept of additive persistence (AP).

AP refers to the number of "digit sums" that need to be performed to produce the digital root. For a base b, the first number, $A_K$, such that $ap_b(A_k)=k$ is given by:

$$A_k = \left\lceil 2 \cdot b^{\left(\frac{A_{k-1}-1}{b-1}\right)} \right\rceil - 1 \text{ for } k > 1, \text{ and where } A_0 = 0 \text{ and } A_1 = b.$$

Also, if $n < A_k$, then $ap_b(n) < k$.

The following table shows the trend for the AP for digital roots with different bases:

TABLE 1

Additive Persistance Trends for Different Digital Root Bases

| $A_K$ | b = 2 | b = 8 | b = 10 | b = 16 | b = 32 |
|---|---|---|---|---|---|
| k = 0 | 0 | 0 | 0 | 0 | 0 |
| k = 1 | 2 | 8 | 10 | 16 | 32 |
| k = 2 | 3 | 15 | 19 | 31 | 63 |
| k = 3 | 7 | 127 | 199 | 511 | 2047 |
| k = 4 | 127 | $2^{55} - 1$ | $2 \cdot 10^{22} - 1$ | $2^{137} - 1$ | $2^{331} - 1$ |

It may be noted that, for digital roots of 3-5 bits, less than 4 digital adders are required for word lengths of hundreds of bits. Therefore, the hardware complexity of a digital root function will be on the same order as a 4-bit digital multiplier.

As for the error detecting properties and capabilities of digital roots, the average Hamming distance between any two numbers with the same digital root is larger than that between any two numbers with different digital roots. Also, it can be shown that the minimum Hamming distance between any two numbers with the same digital root is 2. Therefore, for the probability P of any random bit in a B-bit number flipping, we can make the following observations:

1. The probability of all detectable errors falls off with B×P.

2. The probability of all undetectable errors falls off with 2×P².

Accordingly, digital roots are very good at detecting computational and timing errors in hardware. Consequently, digital roots may be used as very reliable estimators for the current error rate, and they can be used to probe or estimate the hardware error rate of the entire die, similar to in-die temperature sensors used to monitor thermal performance.

In one embodiment or scenario, a data processing system according to the present disclosure involves a processor with a DRBETA. A system with a DRBETA does not assume or require error-free computations as a fundamental design constraint. Instead, the system detects (without necessarily correcting) computational errors at the time of execution and computes the instantaneous error probability or error rate of the physical hardware. The system then uses the detected error rate to adjust the power and/or performance of the hardware. Also, the technology described herein may be used to detect errors in any arithmetic or logical operation without imposing significant additional overhead regarding the time needed to complete that operation.

A first aspect of the operating methodology is that at least a portion of the processor operates in a mode (through voltage and/or clock rate adjustments) that is intended to achieve a target (non-zero) error rate. For instance, a portion of the processor that is used by software for wireless signal processing may be configured to operate in a mode that is intended to achieve a target error rate of approximately $10^{-3}$. In general, the operating voltage of a voltage-controlled circuit is intentionally lowered to be below the error-free threshold and as close as possible to the maximum tolerable error rate.

For purposes of this disclosure, the operations that a circuit (e.g., the enhanced adder 36 in FIG. 1) performs to execute a single instruction (e.g., an ADD instruction) may be referred to collectively as an "execution cycle." Some circuits are able to complete an execution cycle in one clock cycle. Also, an error rate of a component (e.g., enhanced adder 36) or a collection of components (e.g., the controlled voltage domain 30 in FIG. 1) may be expressed as the inverse of the number of execution cycles per detected error. In other words, the error rate for a given number of execution cycles may be computed as the number of errors detected, divided by the number of execution cycles.

A second aspect of the operating methodology is that software in the data processing system is designed to tolerate errors up to a certain probability. For instance, an application that provides wireless signal processing functions may be designed to tolerate an error rate of approximately $10^{-3}$ (which may also be expressed as 0.1%, or as one error per 1000 execution cycles). For example, traditional computational algorithms may be modified to suffer less from errors. Then, for each algorithm, the developer may determine a maximum tolerable error rate. In particular, maximum tolerable error rate may be a parameter to indicate the highest hardware error rate (a) that does not lead to runaway error propagation and (b) that enables the algorithm to produce valid/correct output in most cases. Such algorithms may be referred to as "error-tolerant algorithms" or "error-tolerant software."

A third aspect is that the processor uses digital roots to detect errors in the relevant portion(s) of the processor. For instance, processors may use digital roots to detect errors in any type of operation used in the baseband of digital communications and computations systems. In particular, a processor uses digital roots to monitor the instantaneous hardware error rate at the time of algorithm execution.

A fourth aspect is that the processor compares the detected error rate against the target error rate and automatically adjusts the operating mode to bring the detected error rate into line with the target error rate. Thus, the processor may adjust the operating mode through the use of closed-loop voltage control. If the actual error rate is not equal to the target error rate (or the tolerable error rate), the processor may increase or decrease the circuit voltage, and/or the processor may increase or decrease the operating frequency.

By combining the above aspects, a processor with a DRBETA is able to match the error probability in the hardware with the error tolerance of the software algorithms, resulting in significant improvements in power and performance, relative to a conventional processor.

According to the present disclosure, a processor with a DRBETA includes at least one execution block and at least one circuit for generating digital roots in that execution block. For purposes of this disclosure, a circuit for generating digital roots may be referred to as a "digital root generator" (DRG). As described in greater detail below, the processor uses the digital roots produced by the DRG to determine whether the execution block has produced correct output. In other words, the processor automatically uses the digital roots to verify execution results. Furthermore, as described in greater detail below, the processor may automatically adjust the voltage and/or frequency of the execution block to a level that causes the execution block to occasionally produce incorrect results, while maintaining the error rate below a predetermined threshold. A data processing system may use the processor along with error tolerant software to achieve increased power efficiency and/or increased throughput, relative to a conventional data processing system.

For purposes of this disclosure, the term "execution block" refers to a circuit in a processor that accepts at least one input value, performs at least one operation based on that input value, and generates at least one output value as a result of that operation or those operations. For instance, a processor may include a different execution block to implement the operations needed to execute each of the different instructions in the instruction-set architecture (ISA) for that processor. In addition, a processor may include multiple instances of the same kind of execution block, to enable the processor to execute different instances of the same instruction at the same time. For instance, a processor may include multiple addition circuits (adders) for executing ADD instructions, multiple multiplication circuits (multipliers), multiple circuits for finding the minimum value (MIN circuits), etc.

Also, as indicated above, a processor with a DRBETA includes at least one execution block that includes at least one DRG, and the processor uses the digital roots produced by the DRG to determine whether the execution block has produced correct output. For purposes of this disclosure, an execution block which includes at least one DRG for verifying execution results may be referred to as an "enhanced execution block." By contrast, an execution block which does not include a DRG for verifying execution results may be referred to as a "basic execution block."

FIG. 1 is a block diagram of an example embodiment of a data processing system 10 with a processor 12 that features a DRBETA. Data processing system 10 is a hypothetical system, with various hypothetical components and features to illustrate the technology introduced herein. For instance, data processing system 10 includes random access memory (RAM) 14, non-volatile storage (NVS) 16, and a network interface controller (NIC) 18. Each of those component is in communication with processor 12.

In the embodiment of FIG. 1, processor 12 is an integrated circuit package that operates as a central processing unit (CPU). Processor 12 may be implemented, for instance, as one or more integrated circuits on dies or "chips" that is/are mounted to a substrate to form a package. Also, in some embodiments or scenarios, a data processing system may include one or more other kinds of integrated circuit packages that feature a DRBETA. Such integrated circuit packages may include without limitation graphics processors, NICs, etc.

For purposes of illustration, data processing system 10 is illustrated with a single NVS device. However, in other embodiments, NVS may reside in multiple devices, including without limitation within processor 12.

In the embodiment of FIG. 1, NVS 16 includes software such as firmware 70, an operating system (OS) 72, and an application 74. Processor 12 may copy software from NVS 16 into RAM 14 for execution. That software may include error-tolerance control (ETC) software 76. Different software components or modules within data processing system 10 may include different parts of ETC software 76. For instance, in the embodiment of FIG. 1, some of ETC software 76 resides in firmware 70, some resides in OS 72, and some resides in application 74. Thus, when processor 12 is executing application 74, ETC software 76 may exist in the firmware, kernel, and user spaces. For purposes of this disclosure, ETC software (ETCS) which resides in firmware may be referred to as "firmware ETCS," ETCS which resides in the OS may be referred to as "OS ETCS," and ETCS which resides in an application may be referred to as "application ETCS." Also, a domain within a processor with power characteristics that are automatically adjusted based on monitored error rates may be referred to as a "controlled voltage domain" (CVD).

In one embodiment or scenario, application 74 may be a graphics application (e.g., a video player) which can tolerate some errors without causing a significant effect on the visual quality of the video output produced by application 74. Processor 12 will use one or more execution blocks in a CVD 30 within processor 12 to execute at least part of application 74. The portion of ETC software 76 within application 74 may communicate with the portion of ETC software 76 within OS 72 to specify a maximum allowable error rate. In response, the portion of ETC software 76 within OS 72 may communicate with the portion of ETC software 76 within firmware 70 to relay the maximum allowable error rate to firmware 70. Firmware 70 may then set the target error rate for CVD 30, based on the maximum allowable error rate. Processor 12 may then monitor the error rate of CVD 30 and automatically adjust power characteristics of CVD 30, based on the target error rate. In one embodiment, operations for monitoring the error rate of CVD 30 and/or automatically adjust power characteristics of CVD 30 may be performed at least in part by the portion of ETC software 76 within firmware 70.

In the embodiment of FIG. 1, processor 12 includes cores 20A and 20B. As illustrated, core 20A includes a master voltage domain (MVD) 50, a CVD 30, and a voltage controller 60. MVD 50 includes an error-tolerance (ET) control circuit 52 which monitors the error rate of one or more execution blocks within CVD 30. ET control circuit 52 may also be referred to as "ET controller" (ETC) 52. MVD 50 operates with voltage and frequency settings that are designed to minimize or eliminate the likelihood of execution errors within MVD 50. For instance, MVD 50 may operate with voltage and frequency settings that are expected to result in a computational error rate of $10^{-15}$ or less.

In addition, ETC 52 uses voltage controller 60 to adjust the voltage and/or frequency of CVD 30, based at least in part on the rate of errors detected within CVD 30. In particular, as described in greater detail below, ETC 52 may take advantage of the design margin within the CVD to either lower power or increase throughput. The circuitry within ETC 52 may be referred to as "error tracking and control circuitry."

For purposes of this disclosure, the voltage of a voltage domain and the frequency of a voltage domain may each be referred to as a "power characteristic" of that voltage domain. Similarly, a request to adjust (a) the voltage of a voltage domain, (b) the frequency of a voltage domain, or (c) both the voltage and frequency of a voltage domain may be referred to as a "power adjustment request."

Core 20B may include the same kinds of components as core 20A (e.g., an MVD, a CVD, and a voltage controller). Also, in alternative embodiments, a data processing system may include multiple processors, at least one of which includes at least one core with an MVD, a CVD, and a voltage controller. Also, in other embodiments, a processor may include fewer cores or more cores. For instance, a processor may include a single core, or tens or hundreds of cores.

In the embodiment of FIG. 1, CVD 30 includes four execution blocks: three basic adders 32-34, and an enhanced adder 36. Basic adder 32 is a circuit that accepts input values and produces the sum of those input values as an output value. In particular, as described in greater detail below, basic adder 32 is a full adder which accepts A, B, and carry-in (C-in) values as input and produces sum (S) and carry-out (C-out) values as output. For purposes of this disclosure, the input values for a basic execution block may be referred to in general as "basic input values," and the output values for a basic execution block may be referred to in general as "basic output values" or "basic results." For instance, in a single execution cycle, a basic adder may produce a basic result that includes multiple basic output values (e.g., S and C-out).

Enhanced adder 36 is also a full adder, designed to accept the same basic input values and produce the same basic results. However, as described in greater detail below, enhanced adder 36 produces additional output pertaining to error tolerance. That output may be referred to in general as "error-tolerance results" or "ET results." In particular, the ET results include error reports to indicate whether or not enhanced adder 36 generated the correct basic results. Processor 12 may then use the error reports to determine whether the voltage and/or frequency of CVD 30 should be adjusted, as described in greater detail below. The circuitry for generating ET results may be referred to as a "test execution block" or a "test block," for short. For instance, FIG. 1 illustrates test block 40 within enhanced adder 36.

In particular, in the embodiment of FIG. 1, enhanced adder 36 includes a basic adder 38A and test block 40. Test block 40 includes a basic adder 38B, as well as digital root generators (DRGs) 42A-42C, a digital root comparator (DRC) 46, and an error reporter 48. Basic adders 38A and 38B may be implemented using the same kind of circuit as basic adders 32-34.

Figure 2:
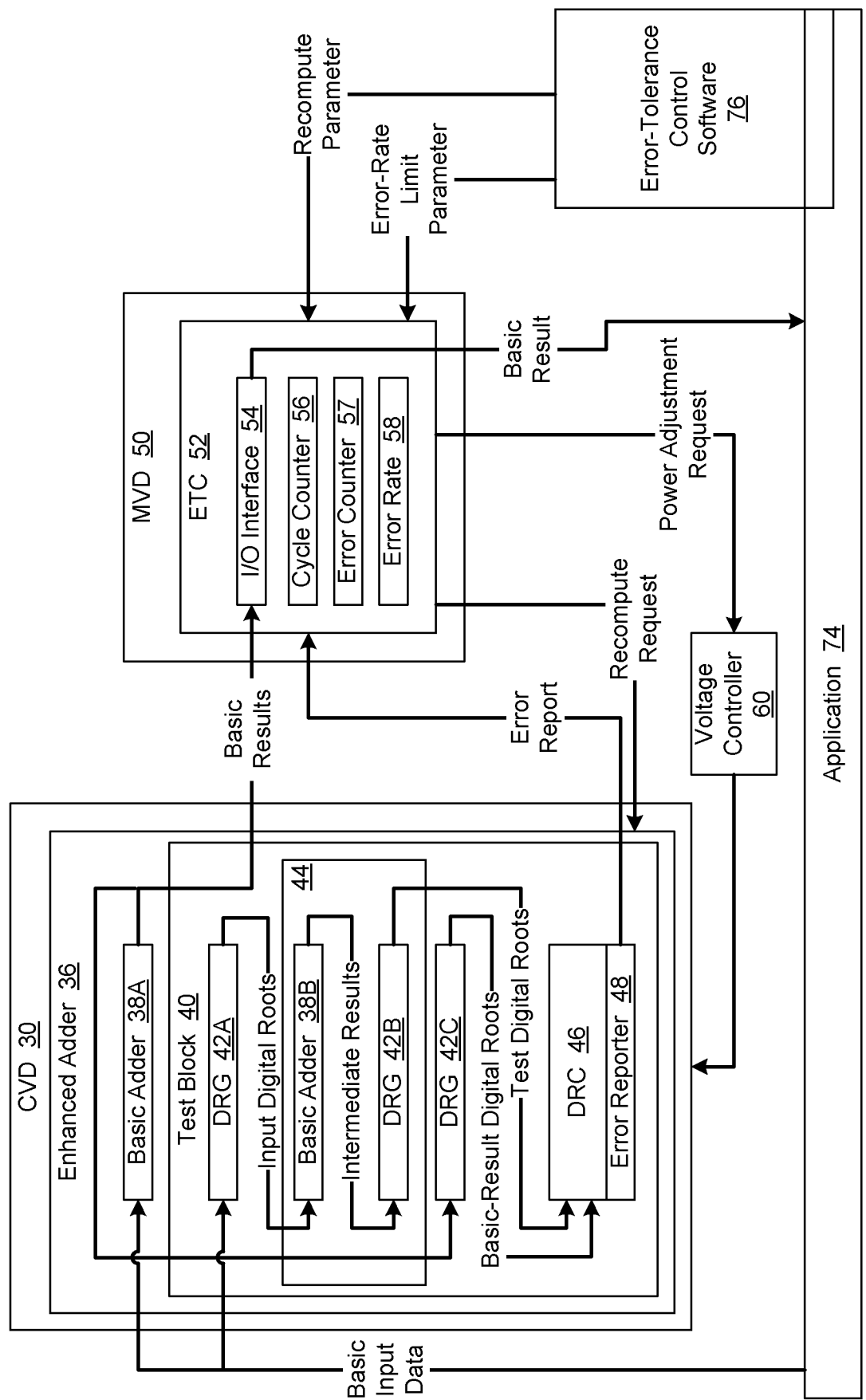
FIG. 2 is a flow diagram depicting data flows between different components of the data processing system of FIG. 1 according to an example scenario.

FIG. 2 is a flow diagram depicting data flows between different components of data processing system 10 according to an example embodiment or scenario. The various operations performed in connection with those data flows may be grouped into seven fundamental operations or functions for implementing a DRBETA: (1) Set the target error rate. (2) Compute the digital roots of the input values. (3) Execute the instruction on the original input values and on the digital roots. (4) Compute the digital roots of all of the output values. (5) Compare the digital roots to determine whether an error occurred. (6) Compute the current error rate. (7) If necessary, adjust the power characteristics. Data processing system 10 may use those 7 steps or functions to protect an instruction with digital roots. In particular, a data processing system may use functions 2-6 a method to probe the reliability of the hardware under the current operating conditions (e.g., supply voltage, clock rate, temperature, etc.).

With regard to function (1) above, in the embodiment of FIG. 2, the data flow begins with ETC software 76 sending an error-rate limit parameter and a recompute parameter to ETC 52 in MVD 50, as illustrated on the right side of FIG. 2. For purposes of this disclosure, the input values that ETC 52 receives from ETC software 76 may be referred to in general as "error-tolerance parameters" or "ET parameters." The error-rate limit parameter may specify a maximum allowable error rate, based on input from application 74, OS 72, and/or firmware 70. For purposes of this disclosure, the error-rate limit parameter may also be referred to as a "target error rate" or an "ET limit."

Processor 12 may then begin executing the workload of application 74. For example, processor 12 may use CVD 30 to execute instructions for application 74, including instructions which involve input data. In an example scenario, one of those instructions is an ADD instruction, and the input data for that instruction includes the input values A, B, and C-in. As indicated above, such input data may be referred to as "basic input values."

With regard to function (2) above, enhanced adder 36 uses DRG 42A in test block 40 to generate the digital roots of the basic input values. In the example scenario, those digital roots may be referred to respectively as $A_{DR}$, $B_{DR}$, and $C\text{-in}_{DR}$, and they may be referred to in general as "input digital roots." More generally, for each of input values $I_1$–$I_N$, DRG 42A generates digital roots $I\text{-}DR_1$–$I\text{-}DR_N$. An example embodiment of a circuit for generating digital roots is described below with regard to FIG. 3.

With regard to function (3) above, enhanced adder 36 uses basic adder 38A to generate the basic output values S and C-out, based on the basic input values A, B, and C-in. And enhanced adder 36 uses basic adder 38B in test nucleus 44 to perform the same operation or operations on the input digital roots as basic adder 38A performs on the basic input values. Basic adder 38B may perform that operation(s) on the input digital roots at least partially in parallel with basic adder 38A performing the same kind of operation(s) on the basic input values. For purposes of this disclosure, the two output values generated by basic adder 38B may be referred to respectively as DR-S and DR-C-out, and they may be referred to in general as "intermediate output values" or "intermediate results." In particular, the intermediate result from a single execution cycle of basic adder 38B may include multiple intermediate output values (e.g., DR-S and DR-C-out). More generally, basic adder 38A generates basic output values $O_1$–$O_M$, and basic adder 38B generates corresponding intermediate output values $O\text{-}I_1$–$O\text{-}I_M$.

With regard to function (4) above, enhanced adder 36 uses DRG 42C to generate digital roots for the basic output values from basic adder 38A. The digital roots of the basic output values may be referred to respectively as $S_{DR}$ and $C\text{-out}_{DR}$, and they may be referred to in general as "basic-result digital roots." More generally, DRG 42C generates $O\text{-}DR_1$–$O\text{-}DR_M$.

Furthermore, enhanced adder 36 uses DRG 42B to generate digital roots for the outputs from basic adder 38B (i.e., for the intermediate output values). The digital roots of the intermediate output values (i.e., the digital roots of DR-S and DR-C-out) may be referred to respectively as $S_{DR}^2$ and $C\text{-out}_{DR}^2$, and they may be referred to in general as "final derived digital roots." More generally, DRG 42B generates $O\text{-}DR^2_1$–$O\text{-}DR^2_M$.

However, as described in greater detail below, in an alternative embodiment, an enhanced execution block may use a different technique to generate the values that are to be compared with the basic-result digital roots. Nevertheless, a digital-root based result that is to be compared with a basic-result digital root may be referred to as "test digital root."

Also, the component (or components) within a test block which generates one or more test digital roots, based on one or more input digital roots may be referred to as a "test nucleus." A test nucleus may generate the test digital roots in a single execution cycle.

In the embodiment of FIG. 2, test nucleus 44 in test block 40 includes basic adder 38B and DRG 42B. However, as indicated above, other types of test nuclei may be used in other embodiments, including test nuclei which perform operations on the input digital roots that differ from the operations performed on the basic input data. For example, a test nucleus may convert the input digital roots into test digital roots in a single step.

For instance, instead of basic adder 38B and DRG 42C, an enhanced adder may include a test nucleus that uses modulo arithmetic to generate results within the digital root domain. For purposes of this disclosure, the term "matching test nucleus" refers to a test nucleus which performs operations on the input digital roots that match the operations performed on the basic input data. By contrast, the term "non-matching test nucleus" refers to a test nucleus which performs operations on the input digital roots that differ from the operations performed on the basic input data. Non-matching test nuclei may be used to verify basic-result digital roots for a wide variety of instruction types, including addition instructions, multiply instructions, etc.

With regard to function (5) above, DRC 46 then compares the basic-result digital roots (i.e., $S_{DR}$ and $C\text{-out}_{DR}$) with the final derived digital roots (i.e., $S_{DR}^2$ and $C\text{-out}_{DR}^2$) to determine whether basic adders 38A and 38B operated correctly. If ($S_{DR}$ equals $S_{DR}^2$) and ($C\text{-out}_{DR}$ equals $C\text{-out}_{DR}^2$) then DRC 46 concludes that basic adders 38A and 38B operated correctly. However, if either of those comparisons is false, then DRC 46 concludes that an error occurred. Error reporter 48 then sends an error report to ETC 52 to indicate whether or not the instruction executed without error.

With regard to function (6) above, ETC 52 then increments a cycle counter 56 in response to the error report, and ETC 52 increments an error counter 57 if the error report indicates that an error was detected. ETC 52 then computes an instantaneous error probability or error rate, based on cycle counter 56 and error counter 57. ETC 52 may store the result in error rate 58. That error rate may also be referred to as the "detected error rate."

With regard to function (7) above, ETC 52 monitors error reports from enhanced adder 36 to determine whether the rate of errors is below, at, or above the predetermined target error rate. If the error rate is below the target error rate, ETC 52 may automatically send a power adjustment request to voltage controller 60 to cause voltage controller 60 to reduce the voltage and/or increase the frequency of CVD 30. If the error rate is above the predetermined target error rate, ETC 52 may automatically send a power adjustment request to voltage controller 60 to cause voltage controller 60 to increase the voltage and/or decrease the frequency of CVD 30. ETC 52 may set the target error rate based on the predetermined ET limit specified by ETC software 76.

ETC 52 may also use input from ETC software 76 to determine other settings or behaviors with regard to error tolerance. For instance, the recompute parameter from ETC software 76 may indicate that ETC 52 should cause CVD 30 to recompute results in response to any errors detected. Consequently, if the error report from enhanced adder 36 to ETC 52 indicates that enhanced adder 36 detected an error, ETC 52 may send a recompute request to enhanced adder 36 to instruct enhanced adder 36 to execute the addition again.

If the error report indicates that enhanced adder 36 completed its operations without detecting an error, or if the recompute parameter indicates that results do not need to be recomputed in response to errors, ETC 52 may use an input/output (I/O) interface 54 to forward the basic result from enhanced adder 36 to application 74 via firmware 70 and OS 72.

Figure 3:
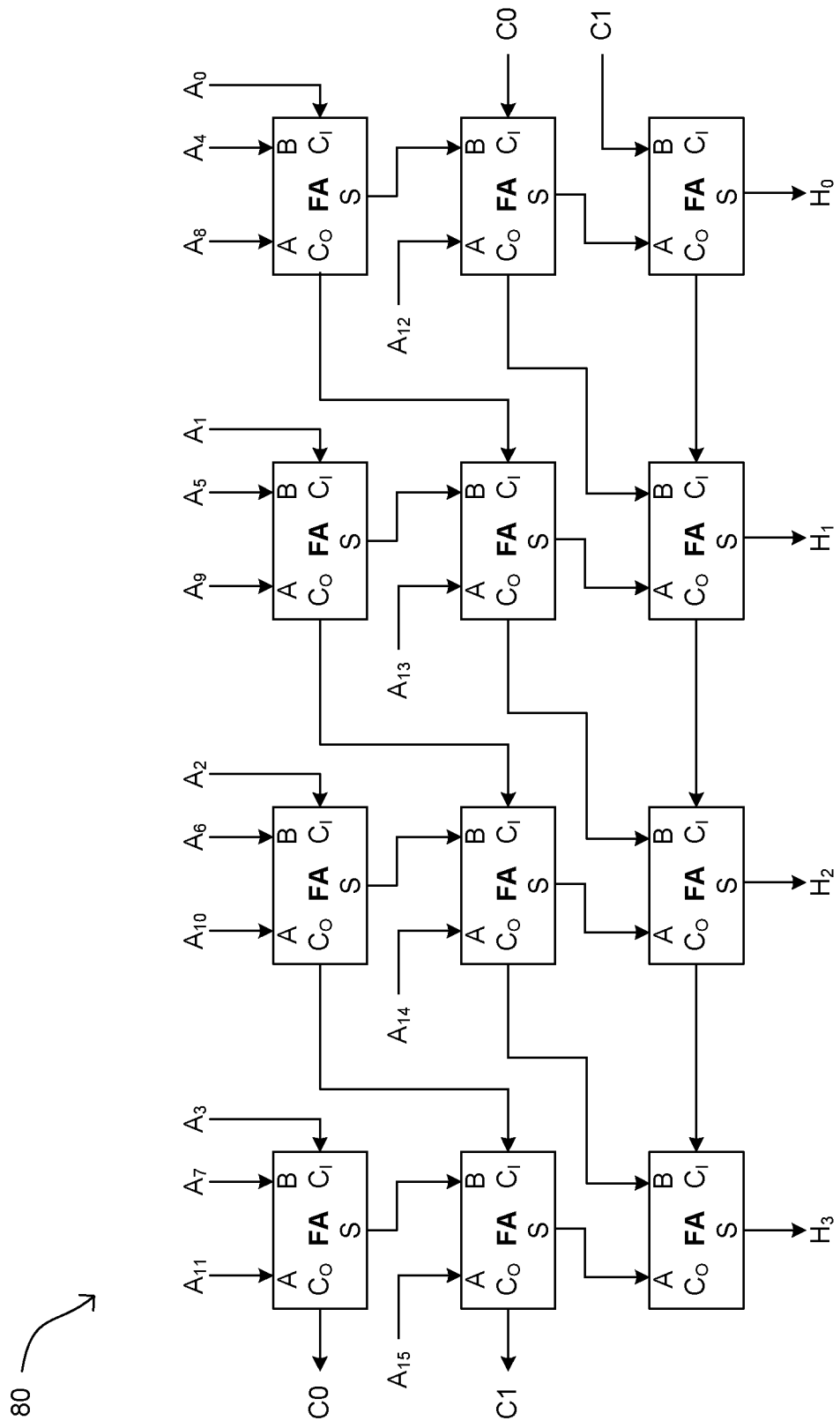
FIG. 3 is a block diagram of an example embodiment of a digital root generator.

FIG. 3 is a block diagram of an example embodiment of a DRG 80. In the embodiment of FIG. 3, DRG 80 is configured to generate a 4-bit digital root based on a 16-bit input value. In other words, DRG 80 implements a base-16 digital root hashing function for 16-bit numbers. The complexity of DRG 80 roughly half that of a 4-bit multiplier. In general, the complexity of an N-bit digital root hash is approximately equivalent to an N×4 binary multiplier, and all of the math in the digital root domain is equivalent to the N-bit equivalent. For instance, with regard to FIG. 2, if basic adder 38A is a 32-bit adder and DRG 42A generates 4-bit digital roots, then the complexity of each of DRGs 42A-42C is on the same order as a 4×4 multiplier, and basic adder 38B is a 4-bit adder.

DRG 42A may include three instances of DRG 80: one instance for each basic input value. DRG 42C may include two instances of DRG 80: one instance for each output value of basic adder 38A. Likewise, DRG 42B may include two instances of DRG 80: one instance for each output value of basic adder 38B.

As illustrated in FIG. 3, DRG 80 includes 12 instances of a full adder (FA), to add three input bits (A, B, and $C_I$) to generate two output bits (S and $C_O$). Also, input lines $A_0$-$A_{15}$ represent the 16 bits to be converted into a 4-bit digital root. Also, lines $C0$ and $C_1$ show outputs from two FAs in the left column that feed into two other FAs in the right column. And lines $H_0$-$H_3$ represent the 4 output bits that constitute the digital root of the input value.

As indicated above, FIG. 1 illustrates an embodiment with a CVD that includes four execution blocks: three basic adders and an enhanced adder. In another embodiment, a CVD may include multiple different types of basic execution blocks. In addition or alternatively, the CVD may include multiple different types of enhanced execution blocks. For instance, a processor in a data processing system designed for digital communications may include without limitation three basic execution blocks for multiplication (MUL), one enhanced execution block for MUL, three basic execution blocks for a multiply-accumulate (MAC) operation, one enhanced execution block for MAC, two basic execution blocks for a minimum (MIN) operation, one enhanced execution block for MIN, etc. In particular, the CVD may include just a few enhanced execution blocks to protect just a few critical operations with digital-root based error detection, and the ETC may use those enhanced execution blocks to probe the hardware error rate of the CVD.

Communications software may run on the processor to provide communication services such as baseband receiving (RX). In particular, the processor may use the basic and enhanced execution blocks in the CVD to execute the instructions from the communications software for performing operations or functions such as forward error correction (FEC), fast Fourier transform (FFT), etc. In addition, the software for those functions may be inherently robust to computational errors, since those errors are, at a mathematical or logical level, not significantly different from transmission errors due to a noisy channel. Consequently, the software and the ETC may set the target computational error rate at a relatively large value (e.g., $10^{-3}$), and the ETC may adjust power characteristics of the CVD to attain that target error rate without causing any perceivable degradation in bit error rate (BER) performance. For instance, the software and hardware may implement an LDPC decoder according to the 802.11n-2009 ("802.11n") wireless communication standard set forth by the Institute of Electrical and Electronics Engineers (IEEE). In such an implementation, a processor with DRBETA might achieve an improvement in throughput over 50% or more if the frequency is increased and the supply voltage remains the same (relative to a similar processor without a DRBETA), or the processor might achieve a reduction in power of about 65% if the clock rate remains the same (relative to a similar processor without a DRBETA).

Similarly, a data processing system may use digital roots to protect other operations/algorithms within the baseband of a digital receiver (e.g. FFT, correlators, multiple-input and multiple-output (MIMO) demodulation, channel estimation, etc.), to optimize the computational error rates of those operations. Moreover, a processor may include different CVDs with execution blocks for different types of operations, and software may specify a different target error rate for each different CVD. Thus, software may individually control the desired hardware error rate for each different type of operation, to further optimize for power and performance.

Also, software may be designed to treat some (or all) of the messages (or packets) that the software processes as critical, such as messages for which retransmission would cause too much latency and/or would require too much power. And to handle computational errors in such critical messages, the software can instruct the hardware to recompute erroneous results by sending the recompute parameter to the CVD (or CVDs) that is used to process those messages, as indicated above.

Figure 4:
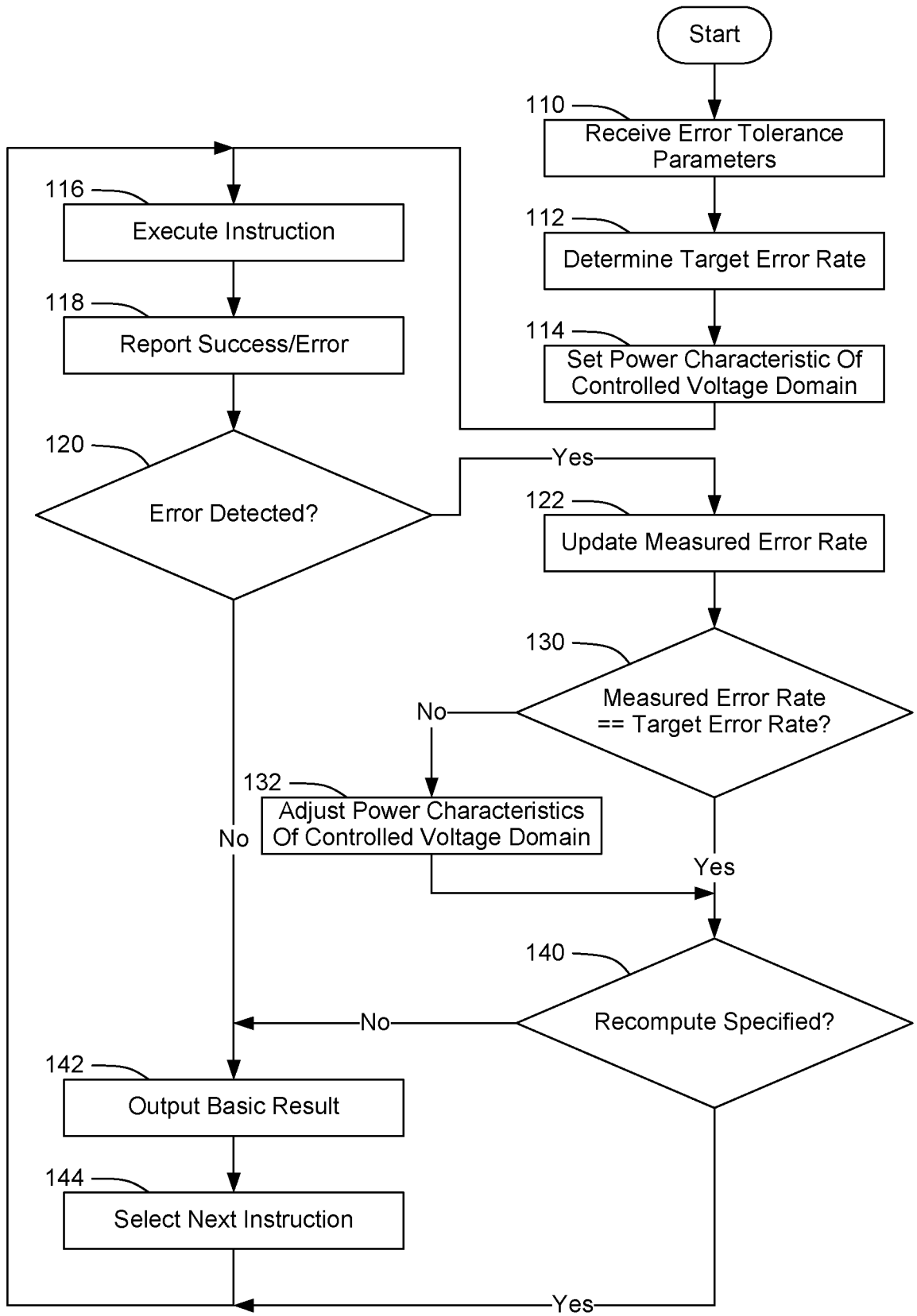
FIG. 4 is a flowchart of an example embodiment of a process for using an error-tolerant architecture for power-efficient computing.

FIG. 4 is a flowchart of an example embodiment of a process for using an error-tolerant architecture for power-efficient computing. For purposes of illustration, that process is described in the context of data processing system 10. The process of FIG. 4 may begin with ETC 52 receiving ET parameters from application 74 via ETC software 76, as shown at block 110. As indicated above, those parameters may include an error-rate limit parameter and a recompute parameter. As shown at block 112, ETC 52 may then determine a target error rate for CVD 30, based on the error-rate limit parameter. In particular, ETC 52 may execute firmware ETCS which uses a predetermined algorithm to set the target error rate based on the error-rate limit parameter. In addition, that algorithm may specify the target error rate as a range. In other words, ETC 52 may specify that the target error rate is matched or satisfied by any detected error rate which falls within a range bounded by a minimum value and a maximum value. In one embodiment, ETC 52 computes the maximum value based on the error-rate limit parameter, and ETC 52 computes the minimum value based on (a) metrics for a time window of past error history and (b) desired power/performance characteristic. For example, a computer vision application may supply an error-rate limit parameter indicating that the application can tolerate an error rate of $2\times10^{-4}$ with acceptable performance degradation. However, ETC 52 may be capable of reliably measuring error rates only down to $5\times10^{-7}$, due to the history of error samples ETC 52 can collect and keep track of at any given time. In such a case, ETC 52 might set a maximum error rate of $1.5\times10^{-4}$ and a minimum error rate of $5\times10^{-5}$ to optimize power/performance characteristics. In other words, ETC 52 might set the target error rate to cover the range from $5\times10^{-5}$ to $1.5\times10^{-4}$.

As shown at block 114, ETC 52 may then set initial power characteristics for CVD 30, based on the target error rate.

As shown at block 116, CVD 30 may then execute an instruction for application 74. For instance, CVD 30 may use enhanced adder 36 to execute an ADD instruction for application 74. During the execution cycle for that instruction, enhanced adder 36 may generate a basic result and an error report, as indicated above. As shown at block 118, enhanced adder 36 may then send the basic result and the error report to ETC 52 to indicate whether or not DRC 46 detected a computational error. In response, ETC 52 may then increment cycle counter 56.

As shown at block 120, ETC 52 may also determine whether an error was reported. If no error was reported, ETC 52 may simply forward the basic result to application 74, as shown at block 142, and select the next instruction for execution, as shown at block 244. The process may then return to block 116 with CVD 30 executing that instruction, etc.

However, referring again to block 120, if an error was reported, ETC 52 may increment error counter 57 and update the measured error rate for CVD 30, as shown at block 122. As shown at block 130, ETC 52 may then determine whether the measured error rate equals or matches the target error rate (which, as indicated above, may be specified as a range). If the measured error rate does not equal the target error rate, ETC 52 may adjust the power characteristics of CVD 30, as shown at block 132. For instance, if the measured error rate is too high, ETC 52 may increase the supply voltage and/or reduce the clock frequency of CVD 30. And if the error rate is too low, ETC 52 may decrease the supply voltage and/or increase the clock frequency of CVD 30.

Also, as shown at block 140, ETC 52 may determine whether application 74 specified that erroneous results from CVD 30 should be recomputed. If recompute was specified, the processor may return to block 116 with CVD 30 executing the same instruction again with the same input values. However, if recompute was not specified, ETC 52 may send the basic result to application 74, as shown at block 142, and may then select the next instruction to be executed, as shown at block 144.

The process may then return to block 116, with processor 12 continuing to execute instructions from application 74 as indicated above.

Thus, processor 12 provides for digital-root based error detection and for dynamic adjustment of power characteristics for one or more CVDs.

In some embodiments, a CVD only includes two, three, or four enhanced execution blocks, and the ETC uses those enhanced execution blocks to probe the hardware error rate of the entire CVD or die, similar to in-die temperature sensors used to monitor thermal performance. Consequently, the area and complexity overhead in the die for implementing a DRBETA may be very insignificant.

In some embodiments, the present teachings may be used to provide both field-programmable gate array (FPGA) and application-specific integrated circuit (ASIC) implementations with a DRBETA.

Additional Embodiments

FIGS. 5-9 are block diagrams of exemplary computer architectures. Such architectures may include processors with a DRBETA as described herein. The same or similar elements in FIGS. 5-9 bear like reference numerals. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 5:
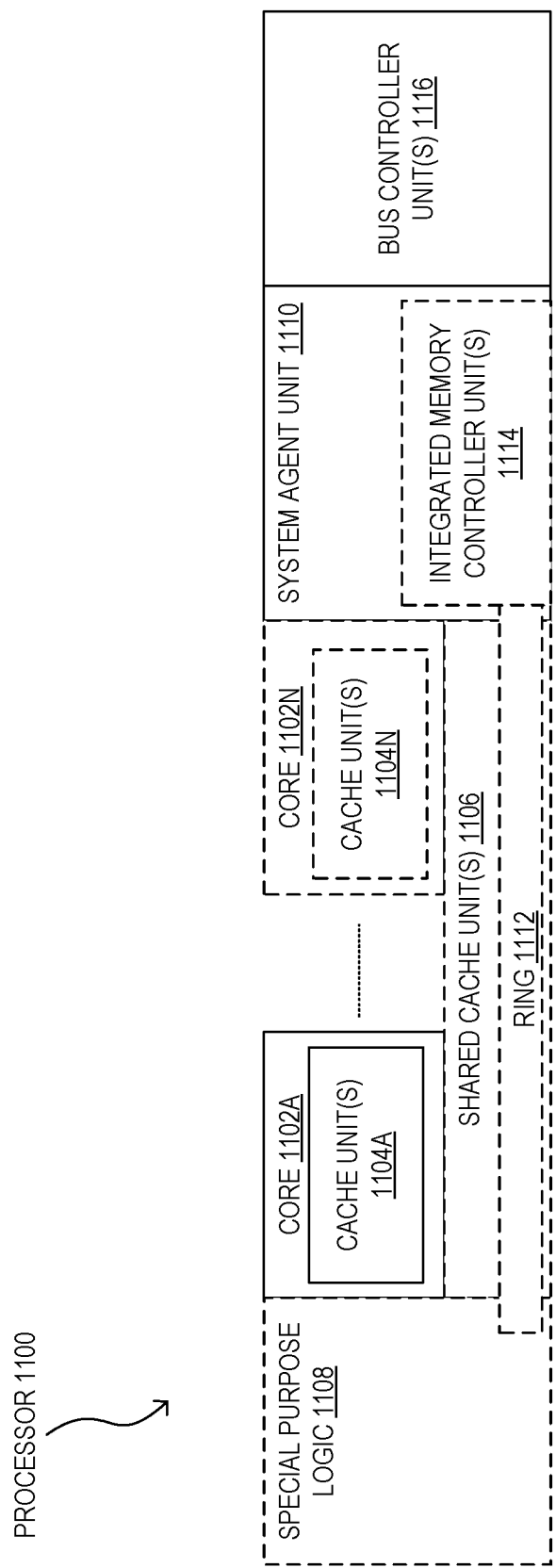
FIG. 5 is a block diagram of a processor that may have more than one core, may have an integrated memory controller, and may have integrated graphics according to one or more embodiments.

FIG. 5 is a block diagram of a processor 1100 that may have more than one core, may have an integrated memory controller, and may have integrated graphics according to one or more embodiments. The solid lined boxes in FIG. 5 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 6:
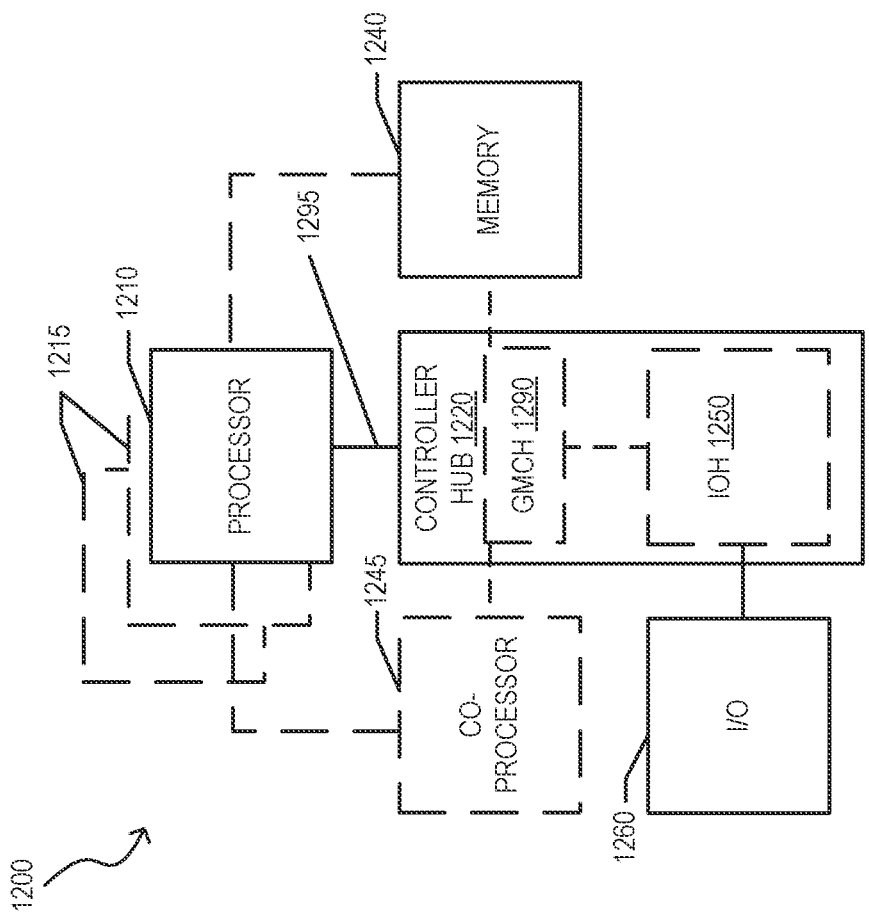
FIG. 6 is a block diagram of a system according to one or more embodiments.

FIG. 6 is a block diagram of a system 1200 according to one or more embodiments. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 6 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 7:
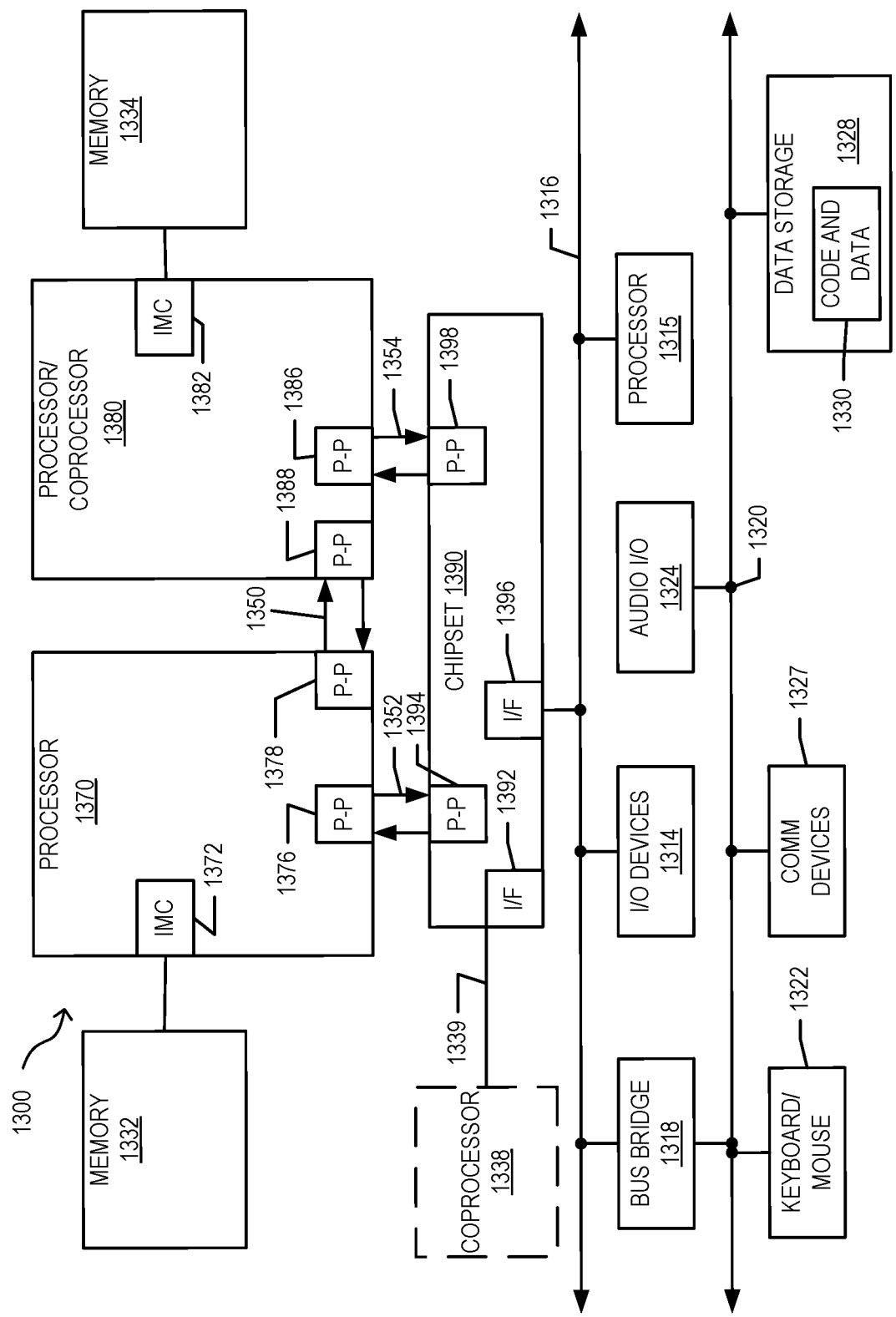
FIGS. 7 and 8 are block diagrams of more specific exemplary systems according to one or more embodiments.
Figure 8:
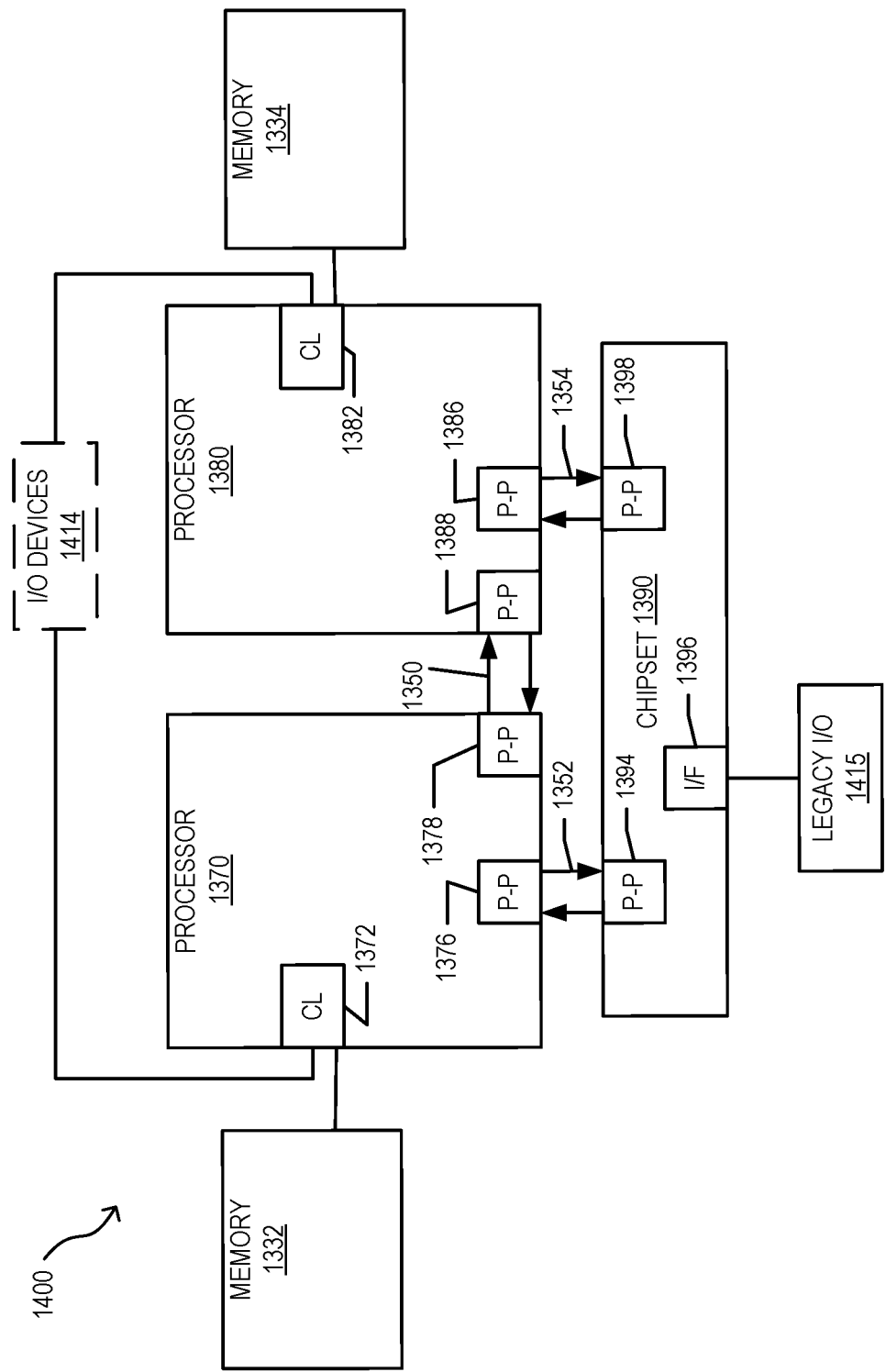

FIGS. 7 and 8 are block diagrams of more specific exemplary systems 1300 and 1400 according to one or more embodiments. As shown in FIG. 7, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 7, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 7, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 7, a system may implement a multi-drop bus or other such architecture.

FIG. 8 presents a block diagram of a second more specific exemplary system 1400 in accordance with on one or more embodiments. Certain aspects of FIG. 7 have been omitted from FIG. 8 in order to avoid obscuring other aspects of FIG. 8.

FIG. 8 illustrates that the processors 1370, 1380 may include integrated memory and I/O control logic ("CL") 1372 and 1382, respectively. Thus, the CL 1372, 1382 include integrated memory controller units and include I/O control logic. FIG. 8 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 9:
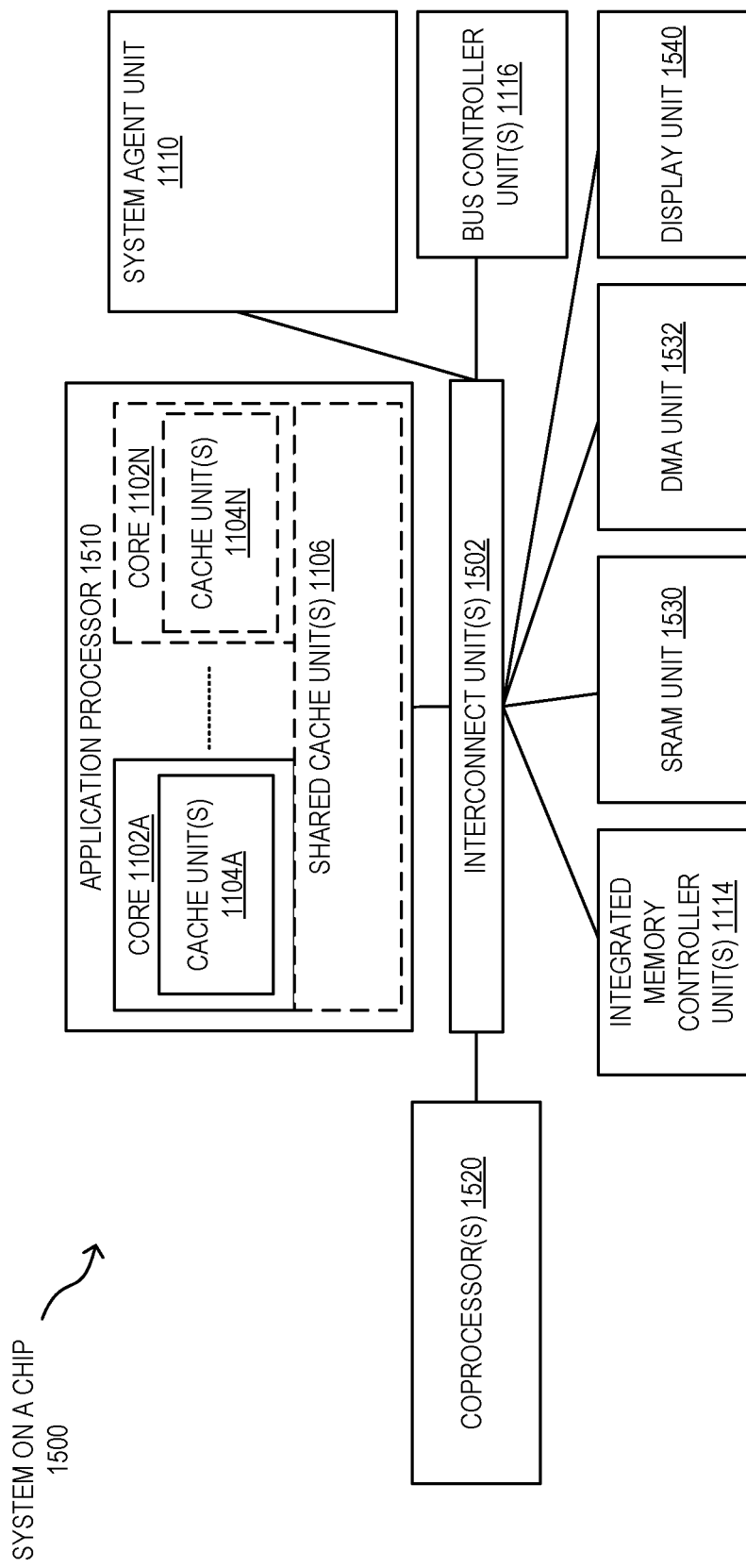
FIG. 9 is a block diagram of a system on a chip according to one or more embodiments.

FIG. 9 is a block diagram of a system on a chip (SoC) 1500 according to one or more embodiments. Dashed lined boxes are optional features on more advanced SoCs. In FIG. 9, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

CONCLUSION

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object oriented programming language, or in assembly or machine language. The mechanisms described herein are not limited to any particular programming language. The language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as apparatus and in particular as program products. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. For instance, in some embodiments, some or all of the control logic for implementing some or all of the described operations may be implemented in hardware logic (e.g., as microcode in an integrated circuit chip, as a programmable gate array (PGA) in a chip, as an application-specific integrated circuit (ASIC) in a chip, as any other suitable type of hardware circuitry in a chip, or as a combination of two or more different instances and/or types of hardware logic in one or more chips). Also, terms such as "circuit" and "circuitry" may be used interchangeably herein. Those terms and terms like "logic" may be used to refer to analog circuitry, digital circuitry, hardwired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip (SoCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. For instance, two components in a data processing system may be described as being "in communication with" each other if those two components are capable of communicating with each other (possibly via one or more intermediate components) when the data processing system is operating.

Also, some components of a data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line.

Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Similarly, components which have been described as residing within other components in an example embodiment may be arranged differently in alternative embodiments. For instance, at least some of the components described above as residing in a test block may not reside in a test block in alternative embodiments.

Embodiments include the following examples:

Example A1 is a semiconductor package comprising an MVD, an ETC circuit in the MVD, and a CVD. The CVD comprises a basic execution block that is configured to generate a basic output value, according to a particular algorithm, based on at least two input values. The CVD also comprises a test execution block comprising (a) a test nucleus that is configured to generate a test digital root, based on digital roots of the input values; (b) a digital root comparator that is configured to determine whether a digital root of the basic output value matches the test digital root; and (c) an error reporter that is configured to send an error report to the ETC circuit in response to a determination that the digital root of the basic output value does not match the test digital root.

Example A2 is a semiconductor package according to Example A1, wherein the CVD comprises at least one DRG that is configured to generate the digital roots of the input values and the digital root of the basic output value.

Example A3 is a semiconductor package according to Example A1, wherein the ETC circuit in the MVD is configured to automatically adjust at least one power characteristic of the CVD, based on the error report from the CVD. Example A3 may also include the features of Example A2.

Example A4 is a semiconductor package according to Example A3, further comprising a voltage controller in communication with the CVD and the MVD. The ETC circuit in the MVD is configured to use the voltage controller to adjust at least one power characteristic of the CVD.

Example A5 is a semiconductor package according to Example A1, wherein the particular algorithm enables the semiconductor package to execute a particular instruction. Also, the basic execution block comprises circuitry to implement the particular algorithm. Example A5 may also include the features of any one or more of Examples A2-A4.

Example A6 is a semiconductor package according to Example A1, wherein the test execution block comprises a second instance of the basic execution block that is configured to generate an intermediate result by applying the particular algorithm to the digital roots of the input values. Also, the CVD comprises a DRG that is configured to generate the test digital root, based on the intermediate result. Example A6 may also include the features of any one or more of Examples A2-A5.

Example A7 is a semiconductor package according to Example A6, wherein the DRG that is configured to generate the test digital root comprises a first DRG. Also, the CVD comprises a second DRG that is configured to generate the digital roots of the input values, and a third DRG that is configured to generate the digital root of the basic output value. Example A7 may also include the features of any one or more of Examples A2-A6.

Example A8 is a semiconductor package according to Example A1, wherein (a) the particular algorithm comprises a first algorithm, (b) the test nucleus is configured to use a second algorithm to generate the test digital root, and (c) the second algorithm is different from the first algorithm. Example A8 may also include the features of any one or more of Examples A2-A7.

Example A9 is a semiconductor package according to Example A8, wherein the test nucleus is configured to generate the test digital root, based on the digital roots of the input values, in a single execution cycle.

Example A10 is a semiconductor package according to Example A1, wherein the CVD comprises an enhanced execution block that comprises the basic execution block and the test execution block. Example A10 may also include the features of any one or more of Examples A2-A9.

Example A11 is a semiconductor package according to Example A10, wherein the CVD comprises at least one additional instance of the basic execution block that is configured to generate output values, according to the particular algorithm, without supplying data to digital root generators.

Example A12 is a semiconductor package according to Example A1, wherein the basic execution block is configured to generate multiple basic output values in a single execution cycle, according to the particular algorithm, based on the input values. Also, the test execution block is configured to generate multiple test digital roots that correspond to respective basic output values. Also, the digital root comparator is configured to determine whether each of the test digital roots matches the digital root of the corresponding basic output value. Example A12 may also include the features of any one or more of Examples A2-A11.

Example A13 is a semiconductor package according to Example A1, further comprising at least one die comprising a processor that comprises the CVD and the MVD. Example A13 may also include the features of any one or more of Examples A2-A12.

Example B1 is a data processing system comprising RAM, a processor coupled to the RAM, an MVD in the processor, an ETC circuit in the MVD, and a CVD in the processor. The CVD comprises (a) a basic execution block that is configured to generate a basic output value, according to a particular algorithm, based on at least two input values; and (b) a test execution block. The test execution block comprises (a) a test nucleus that is configured to generate a test digital root, based on digital roots of the input values; (b) a digital root comparator that is configured to determine whether a digital root of the basic output value matches the test digital root; and (c) an error reporter that is configured to send an error report to the ETC circuit in response to a determination that the digital root of the basic output value does not match the test digital root.

Example B2 is a data processing system according to Example B1, wherein the CVD comprises at least one DRG that is configured to generate the digital roots of the input values and the digital root of the basic output value.

Example B3 is a data processing system according to Example B1, further comprising a voltage controller in communication with the CVD and the MVD. Also, the ETC circuit in the MVD is configured to use the voltage controller to automatically adjust at least one power characteristic of the CVD, based on the error report from the CVD. Example B3 may also include the features of Example B2.

Example B4 is a data processing system according to Example B1, wherein the test execution block comprises a second instance of the basic execution block that is configured to generate an intermediate result by applying the particular algorithm to the digital roots of the input values. Also, the CVD comprises a DRG that is configured to generate the test digital root, based on the intermediate result. Example B4 may also include the features of any one or more of Examples B2-B3.

Example B5 is a data processing system according to Example B1, wherein (a) the particular algorithm comprises a first algorithm, (b) the test nucleus is configured to use a second algorithm to generate the test digital root, and (c) the second algorithm is different from the first algorithm. Example B5 may also include the features of any one or more of Examples B2-B4.

Example C1 is a method comprising (a) in a basic execution block in a CVD in a semiconductor package, generating a basic output value, according to a particular algorithm, based on at least two input values; (b) in a test execution block in the CVD, generating a test digital root, based on digital roots of the input values; (c) automatically determining whether a digital root of the basic output value matches the test digital root; and (d) sending an error report to an ETC circuit in an MVD in the semiconductor package, in response to a determination that the digital root of the basic output value does not match the test digital root.

Example C2 is a method according to Example C1, further comprising, by the ETC circuit in the MVD, automatically adjusting at least one power characteristic of the CVD, based on the error report from the CVD.

In view of the wide variety of useful permutations that may be readily derived from the example embodiments described herein, this detailed description is intended to be illustrative only, and should not be construed as limiting the scope of coverage.

What is claimed is:

1. A semiconductor package comprising:
    a master voltage domain (MVD);
    an error-tolerance control (ETC) circuit in the MVD; and
    a controlled voltage domain (CVD) comprising:
        a basic execution block that is configured to generate a basic output value, according to a particular algorithm, based on at least two input values, wherein the basic execution block comprises a first circuit; and
        a test execution block comprising:
            a test nucleus that is configured to generate a test digital root, based on digital roots of the input values;
            a digital root comparator that is configured to determine whether a digital root of the basic output value matches the test digital root; and
            an error reporter that is configured to send an error report to the ETC circuit in response to a determination that the digital root of the basic output value does not match the test digital root, wherein the test execution block comprises a second circuit.

2. A semiconductor package according to claim 1, wherein the CVD comprises at least one digital root generator that is configured to generate the digital roots of the input values and the digital root of the basic output value.

3. A semiconductor package according to claim 1, wherein the ETC circuit in the MVD is configured to automatically adjust at least one power characteristic of the CVD, based on the error report from the CVD.

4. A semiconductor package according to claim 3, further comprising:
    a voltage controller in communication with the CVD and the MVD, wherein the ETC circuit in the MVD is configured to use the voltage controller to adjust at least one power characteristic of the CVD.

5. A semiconductor package according to claim 1, wherein:
the particular algorithm enables the semiconductor package to execute a particular instruction; and
the basic execution block comprises circuitry to implement the particular algorithm.

6. A semiconductor package according to claim 1, wherein:
the test execution block comprises a second instance of the basic execution block that is configured to generate an intermediate result by applying the particular algorithm to the digital roots of the input values; and
the CVD comprises a digital root generator (DRG) that is configured to generate the test digital root, based on the intermediate result.

7. A semiconductor package according to claim 6, wherein:
the DRG that is configured to generate the test digital root comprises a first DRG; and
the CVD comprises:
a second DRG that is configured to generate the digital roots of the input values; and
a third DRG that is configured to generate the digital root of the basic output value.

8. A semiconductor package according to claim 1, wherein:
the particular algorithm comprises a first algorithm;
the test nucleus is configured to use a second algorithm to generate the test digital root; and
the second algorithm is different from the first algorithm.

9. A semiconductor package according to claim 8, wherein the test nucleus is configured to generate the test digital root, based on the digital roots of the input values, in a single execution cycle.

10. A semiconductor package according to claim 1, wherein the CVD comprises an enhanced execution block that comprises the basic execution block and the test execution block.

11. A semiconductor package according to claim 10, wherein the CVD comprises:
at least one additional instance of the basic execution block that is configured to generate output values, according to the particular algorithm, without supplying data to digital root generators.

12. A semiconductor package according to claim 1, wherein:
the basic execution block is configured to generate multiple basic output values in a single execution cycle, according to the particular algorithm, based on the input values;
the test execution block is configured to generate multiple test digital roots that correspond to respective basic output values; and
the digital root comparator is configured to determine whether each of the test digital roots matches the digital root of the corresponding basic output value.

13. A semiconductor package according to claim 1, further comprising at least one die comprising a processor that comprises the CVD and the MVD.

14. A data processing system comprising:
a processor;
at least one storage component coupled to the processor, the at least one storage component capable of storing an application to execute on the processor;
a master voltage domain (MVD) in the processor;
an error-tolerance control (ETC) circuit in the MVD; and
a controlled voltage domain (CVD) in the processor, the CVD comprising:
a basic execution block that is configured to generate a basic output value, according to a particular algorithm, based on at least two input values, wherein the basic execution block comprises a first circuit, and wherein the at least two input values comprise input data for an instruction from the application; and
a test execution block comprising:
a test nucleus that is configured to generate a test digital root, based on digital roots of the input values;
a digital root comparator that is configured to determine whether a digital root of the basic output value matches the test digital root; and
an error reporter that is configured to send an error report to the ETC circuit in response to a determination that the digital root of the basic output value does not match the test digital root, wherein the test execution block comprises a second circuit.

15. A data processing system according to claim 14, wherein the CVD comprises at least one digital root generator that is configured to generate the digital roots of the input values and the digital root of the basic output value.

16. A data processing system according to claim 14, further comprising:
a voltage controller in communication with the CVD and the MVD; and
wherein the ETC circuit in the MVD is configured to use the voltage controller to automatically adjust at least one power characteristic of the CVD, based on the error report from the CVD.

17. A data processing system according to claim 14, wherein:
the test execution block comprises a second instance of the basic execution block that is configured to generate an intermediate result by applying the particular algorithm to the digital roots of the input values; and
the CVD comprises a digital root generator that is configured to generate the test digital root, based on the intermediate result.

18. A data processing system according to claim 14, wherein:
the particular algorithm comprises a first algorithm;
the test nucleus is configured to use a second algorithm to generate the test digital root; and
the second algorithm is different from the first algorithm.

19. A method comprising:
in a basic execution block in a controlled voltage domain (CVD) in a semiconductor package, generating a basic output value, according to a particular algorithm, based on at least two input values, wherein the basic execution block comprises a first circuit;
in a test execution block in the CVD, generating a test digital root, based on digital roots of the input values, wherein the test execution block comprises a second circuit;

automatically determining whether a digital root of the basic output value matches the test digital root; and sending an error report to an error-tolerance control (ETC) circuit in a master voltage domain (MVD) in the semiconductor package, in response to a determination that the digital root of the basic output value does not match the test digital root.

20. A method according to claim 19, further comprising:

by the ETC circuit in the MVD, automatically adjusting at least one power characteristic of the CVD, based on the error report from the CVD.

* * * * *